United States Patent
Miessmer

(10) Patent No.: US 10,759,001 B2
(45) Date of Patent: Sep. 1, 2020

(54) METHOD OF PRODUCING A WELDED RING

(71) Applicant: Oetiker Schweiz AG, Horgen (CH)

(72) Inventor: Stefan Miessmer, Zurich (CH)

(73) Assignee: Oetiker Schweiz AG (CH)

( * ) Notice: Subject to any disclaimer, the term of this patent is extended or adjusted under 35 U.S.C. 154(b) by 0 days.

(21) Appl. No.: 15/568,993

(22) PCT Filed: Nov. 4, 2016

(86) PCT No.: PCT/EP2016/076644
§ 371 (c)(1),
(2) Date: Oct. 24, 2017

(87) PCT Pub. No.: WO2017/148548
PCT Pub. Date: Sep. 8, 2017

(65) Prior Publication Data
US 2018/0369959 A1 Dec. 27, 2018

(30) Foreign Application Priority Data
Feb. 29, 2016 (DE) .......... 10 2016 103 571

(51) Int. Cl.
*B23K 26/00* (2014.01)
*B23K 26/02* (2014.01)
(Continued)

(52) U.S. Cl.
CPC .............. *B23K 26/262* (2015.10); *B23K 9/02* (2013.01); *B23K 9/188* (2013.01);
(Continued)

(58) Field of Classification Search
CPC .. B23K 26/0604; B23K 26/26; B23K 26/262; B23K 33/006; B23K 9/02–0288; B23K 9/188; F16J 15/3252
(Continued)

(56) References Cited

U.S. PATENT DOCUMENTS

| 3,582,601 A | 6/1971 | Wepfer et al. |
| 5,185,908 A * | 2/1993 | Oetiker ............. B23K 26/22 24/20 R |

(Continued)

FOREIGN PATENT DOCUMENTS

| CN | 1514751 A | 7/2004 |
| CN | 201746338 U | 2/2011 |

(Continued)

OTHER PUBLICATIONS

Search report for International Patent Application No. PCT/EP2016/076644; dated Mar. 7, 2017.

*Primary Examiner* — Sang Y Paik
(74) *Attorney, Agent, or Firm* — Barnes & Thornburg LLP

(57) ABSTRACT

For producing a welded ring, a band having a length corresponding to the circumference of the ring is bent to form a ring and its two ends are welded together. The band ends to be welded together have an offset in the circumferential direction of the ring, the offset lying in the plane of the band. The welding is performed form both lateral edges of the ring from the outside up to the offset. This avoids an overlapping weld of a welding quality that is different at the centre of the ring from that at the edges.

6 Claims, 1 Drawing Sheet

(51) Int. Cl.
 *B23K 26/262* (2014.01)
 *B23K 33/00* (2006.01)
 *B23K 26/26* (2014.01)
 *B23K 26/06* (2014.01)
 *B23K 9/18* (2006.01)
 *F16J 15/3252* (2016.01)
 *B23K 9/02* (2006.01)

(52) U.S. Cl.
 CPC .......... *B23K 26/0604* (2013.01); *B23K 26/26* (2013.01); *B23K 33/006* (2013.01); *F16J 15/3252* (2013.01)

(58) Field of Classification Search
 USPC ..... 219/78.16, 101–107, 121.6–121.66, 136, 219/137 R
 See application file for complete search history.

(56) References Cited

U.S. PATENT DOCUMENTS

| | | | |
|---|---|---|---|
| 5,191,683 A | 3/1993 | Ojima et al. | |
| 6,000,601 A * | 12/1999 | Walak | A61F 2/90 228/225 |
| 6,421,886 B1 | 7/2002 | Oetiker | |
| 2010/0187767 A1 | 7/2010 | Stahl | |
| 2012/0061076 A1 | 3/2012 | McDaniel et al. | |
| 2014/0367902 A1 | 12/2014 | Noritoshi et al. | |

FOREIGN PATENT DOCUMENTS

| | | |
|---|---|---|
| CN | 203495422 U | 3/2014 |
| CN | 103 707 002 A | 4/2014 |
| DE | 4009259 A1 | 10/1990 |
| DE | 4021746 C2 | 1/1992 |
| DE | 69725998 T2 | 9/2004 |
| DE | 69729337 T2 | 6/2005 |
| DE | 10 2014 003 533 A1 | 9/2015 |
| EP | 0543338 A1 | 5/1993 |
| EP | 1752247 A1 | 2/2007 |
| EP | 2889104 A1 | 7/2015 |
| JP | S62252632 A | 11/1987 |
| JP | 2001227648 A | 8/2001 |
| JP | 2006000869 A | 1/2006 |
| JP | 2013059778 A | 4/2013 |
| JP | 5327130 B2 | 10/2013 |

\* cited by examiner

METHOD OF PRODUCING A WELDED RING

PRIORITY CLAIM

This patent application is a U.S. National Phase of International Patent Application No. PCT/EP2016/076644, filed 4 Nov. 2016, which claims priority to German Patent Application No. 10 2016 103 571.8, filed 29 Feb. 2016, the disclosures of which are incorporated herein by reference in their entirety.

SUMMARY

The disclosed embodiments is concerned with the general object of avoiding, at least in part, such drawbacks as occur with comparable methods of producing welded rings. A more specific object may be seen to reside in providing a method by which welded rings can be produced with a weld seam as uniform as possible.

This object is successfully solved by providing at the band ends to be welded together an offset in the circumferential direction of the ring and performing the welding from both side edges of the ring from the outside inwards up to the offset. A flush weld is thereby made at both edges of the ring. As a result of the offset, the effect of the melt flowing away in the centre of the ring is reduced by the overlap of the two weld seams, so that a higher welding quality is achieved in the overlapping area.

BRIEF DESCRIPTION OF THE DRAWINGS

A disclosed embodiments will be explained in more detail below with reference to the drawings, in which.

DETAILED DESCRIPTION OF EMBODIMENTS

Figure 1A:
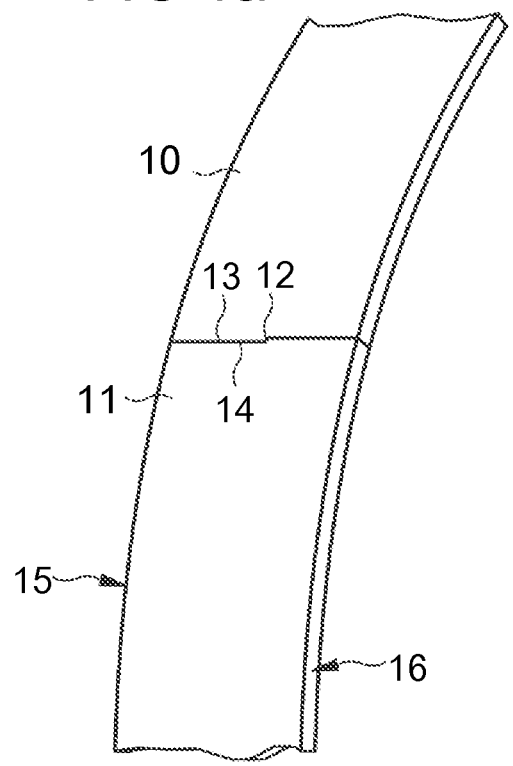
FIGS. 1a and 1b are perspective representations of a portion of the butt of an annularly bent band before and after welding.

In FIG. 1a, the butt where both band ends 10, 11 are welded together has an offset in the form of a step 12 lying within the plane of the band, at which a projecting portion 13 of one band end 10 is opposite to a recessing portion 14 at the other band end 11. The step is formed midway between both band edges 15, 16.

In the welding process, welding is performed from both band edges 15, 16 up to the step 12. Due to the offset, a higher welding quality is achieved in the area of overlap of both weld seams 17, 18 at the respective location. The offset is only so big that a controlled weld connection between both abutting band ends 10, 11 is formed also at this location.

If there is no interruption (offset) at the overlapping location of the two weld seams 17, 18, a weld puddle is formed twice at the abutting bend ends. This leads to a reduced welding quality in the overlapping region. Due to the offset, the effects of the double weld puddle on the welding quality are less and more consistent.

Figure 1B:
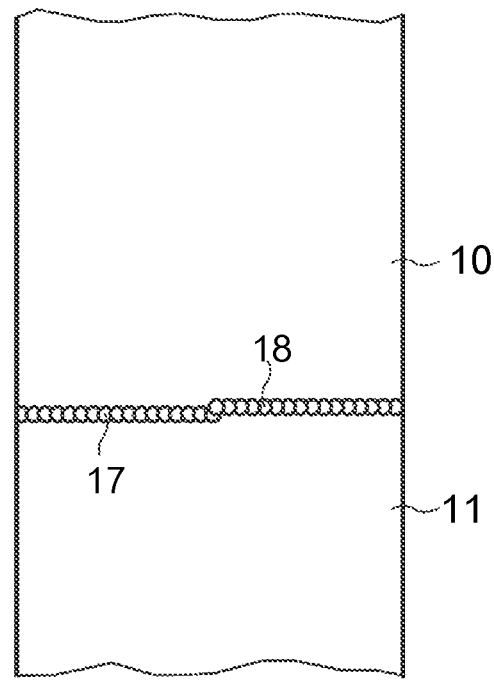
Figure 2A:
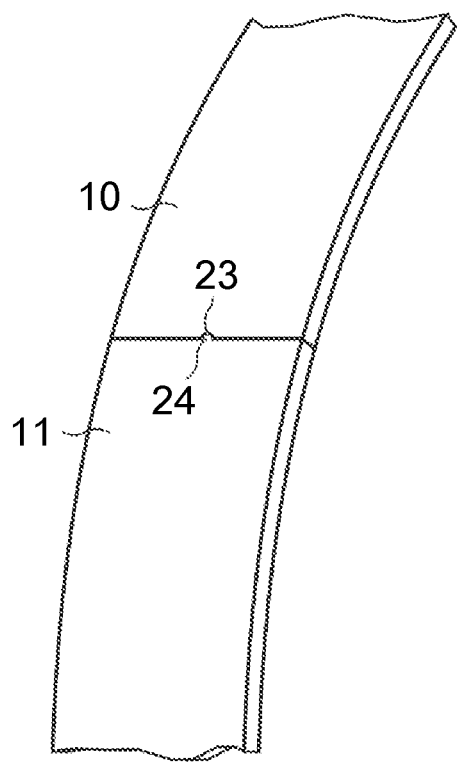
FIGS. 2a and 2b are similar representations with an alternative shape of the butt.
Figure 2B:
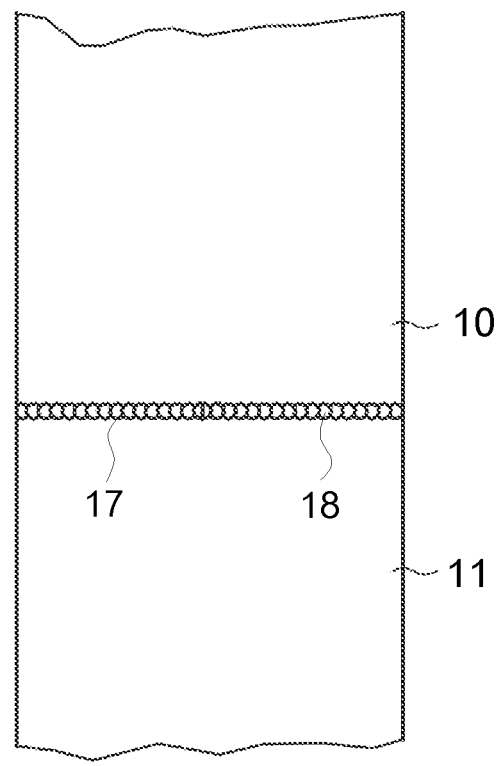

The embodiment of FIGS. 2a and 2b differs from that of FIGS. 1a and 1b in that the offset is formed as a recess 23 in one band end 10 that is engaged by a projection 24 at the other band end 11.

Rings, so-called multi-crimp-rings, are produced in different ways. In one known method, an axially or helically welded tube is divided into rings of desired widths which are subsequently deburred. Disadvantages of this known method are high minimum production volumes required for reasons of cost, correspondingly low flexibility in case of different diameters, and high stock keeping cost for the tube blanks.

In an alternative production method, sections of a length corresponding to the ring diameter are cut from a deburred band cleaved along straight or inclined lines and their ends are welded together.

US 2012/0061076 discloses a stop collar made of a band the two ends of which are butt welded together.

When welding the band ends, a weld that is flush with the edge of the ring can be obtained at the start of the welding process. At the weld exit on the other ring edge, however, a geometry results which is not flush with the edge.

In butt-welding a workpiece exposed to bending, is known from EP 1 752 247 A1 to execute the weld in two partial welds which start at the outer ends and overlap one another in the central region to avoid notches at the outer rim of the workpiece.

The invention claimed is:

1. A method of producing a welded ring, the method comprising:
    bending a band of a length corresponding to a circumference of the ring to form a ring; and
    welding the bended band at its ends, the welding being performed from both lateral edges of the ring from the outside inwards,
    wherein the band ends to be welded together have an offset in a circumferential direction of the ring and the welding is performed from both lateral edges of the ring up to the offset, and wherein the welding from each of the two lateral edges of the ring from the outside inwards is performed entirely in a straight line perpendicular to the circumferential direction.

2. The method of claim 1, wherein the offset is formed as a step at which a portion projecting from one band end is opposite to a recessed portion in the other band.

3. The method of claim 1, wherein the offset is formed as a recess at one band end lying in the plane of the band and engaging a complementary projection on the other band end.

4. The method of claim 1, wherein the offset is provided midway of the band width.

5. The method of claim 2, wherein the offset is provided midway of the band width.

6. The method of claim 3, wherein the offset is provided midway of the band width.

* * * * *